June 16, 1953

J. P. WOODS 2,642,146

SHOT HOLE-ARRAY FOR ELIMINATING
HORIZONTALLY TRAVELING WAVES

Filed Sept. 20, 1950

ATTEST
Melvin C. Flint

INVENTOR.
JOHN PRICE WOODS.
BY Norbert E. Birch
Attorney

INVENTOR.
JOHN PRICE WOODS

Patented June 16, 1953

2,642,146

UNITED STATES PATENT OFFICE 2,642,146

SHOT HOLE ARRAY FOR ELIMINATING HORIZONTALLY TRAVELING WAVES

John P. Woods, Dallas, Tex., assignor to The Atlantic Refining Company, Philadelphia, Pa., a corporation of Pennsylvania Application September 20, 1950, Serial No. 185,750

6 Claims. (Cl. 181—.5)

This invention relates to improvements in seismic methods for geophysical investigation, and particularly to a method of seismic prospecting involving novel arrangements of shot points whereby horizontally traveling waves within a predetermined frequency band are substantially eliminated from the combined output of the several shots or explosive charges.

In seismic prospecting it is conventional practice to detonate an explosive charge at or near the surface of the earth and to receive resulting seismic energy or waves reflected from subsurface formations by means of a series of geophones making up a so-called spread. The geophones are connected to a seismograph or recorder to produce multitrace records of the reflected energy which may be interpreted in determination of subsurface structure.

In practice, areas frequently are encountered in which horizontally traveling waves, reflected from hard rock or other material at or near the surface, are received by the geophones and conducted to the seismograph to appear on the record. This horizontally traveling energy is of such nature that it predominates all or a major portion of the record over the entire frequency band of the reflected waves, thereby obscuring the desired reflected waves on the record.

Accordingly, it is an object of this invention to provide an improved method of seismic prospecting by means of which the above mentioned difficulties are obviated.

Another object of the invention is to provide an arrangement of shot points, whereby horizontally traveling waves within a predetermined frequency band are eliminated substantially from the seismic energy generated upon simultaneous detonation of the several shots.

Other objects and features of the invention will be apparent from the description and drawings which follow.

In accordance with the present invention there is provided a novel method of seismic prospecting whereby undesirable horizontally traveling waves are eliminated substantially from the record through the use of shooting arrays arranged so that the combined seismic disturbance created by simultaneous detonation of explosive charges in the arrays will be free of horizontally traveling waves within a predetermined frequency band. Broadly the shot points are arranged to form at least two parallel arrays, each array consisting of a series of shot points equally spaced one from another. The arrays are of unequal lengths but of lengths such that horizontally traveling waves of a predetermined frequency are eliminated from the seismic disturbance of each array. The combined seismic disturbance of the arrays will be substantially free of the undesirable horizontally traveling waves within a predetermined frequency band.

For a more detailed understanding of the invention, reference is made to the accompanying drawings in which.

Figure 1:
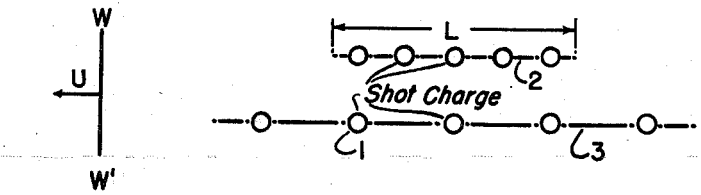
Figure 1 is a diagrammatic view showing an arrangement of shot points whereby horizontally traveling waves within a predetermined frequency band moving longitudinally of the arrays will be substantially eliminated from the seismic energy created by simultaneous detonation of the shot charges.

As above briefly stated, seismograms or records obtained in many areas are of little value in the determination of subterranean structure because the reflected energy is obscured by intense horizontally traveling waves produced by the same detonation as the reflected waves. The amplifiers associated with conventional seismographs or recorders usually are responsive to seismic waves within a given frequency band, such, for example, as from 30 to 60 C. P. S. It is one purpose of this invention to provide arrangements of shot points in a group so that upon simultaneous actuation of the seismic generators or shot charges the energy created will be substantially free of horizontally traveling waves within a predetermined frequency band, preferably corresponding to that of the seismograph amplifiers, as a result of cancellation of some of the energy, thereby to provide a record predominated by reflected energy and substantially free of horizontally traveling energy upon recordation of the energy received by one or more seismometers.

It has been found that such a record may be obtained by use of a multiple shooting arrangement wherein a plurality of shot points are arranged in two parallel arrays of unequal lengths but of lengths such that horizontally traveling waves of a predetermined frequency are substantially cancelled from the energy created by the shots of each array. The combined energy generated by the shots of the two arrays will be free of horizontally traveling waves within a frequency band, the mid-frequency of which corresponds approximately to such predetermined frequency.

The horizontally traveling waves of a given frequency may be cancelled from the energy generated by a series of shots detonated simultaneously by arranging the shot points in a line and spacing the shot points one from another a distance such that the array length L corresponds to an integral number of wave lengths of waves having said given frequency and which it is desired to eliminate. By proper adjustment of the array length L seismic waves of any desired frequency may be eliminated from the energy generated by the array. By "array length" is meant the distance between a point beyond the shot point at one end of the array a distance corresponding to one-half the distance between adjacent shot points and a point a like distance beyond the shot point at the other end of the array. In accordance with the present invention, by utilizing in a multiple shot point arrangement two such arrays disposed in parallel relationship and of unequal lengths but of lengths such that horizontally traveling waves of a predetermined frequency are cancelled from the energy transmitted by each of the arrays, the combined output of the shot group will be substantially free of horizontally traveling waves within a predetermined frequency band, the mid-frequency of which is equal substantially to said predetermined frequency. Thus by means of conventional seismometer arrangements and recording apparatus there may be produced a seismic record or seismogram predominated by reflected energy and from which all seismic waves within a predetermined frequency band have been substantially eliminated.

In practice, in some areas the horizontally traveling waves which interfere with the recording of reflected energy may travel only in one direction from the seismic source. In other cases the interfering horizontally traveling waves may travel in many directions from the shot point.

Referring to the drawings, and at this time to Figure 1, there is shown a multiple shot point arrangement for creation of seismic wave energy which is substantially free of horizontally traveling waves moving longitudinally of the arrays. This arrangement is adapted for use in areas of the first type to eliminate the interfering waves traveling in a single direction from the shot point, the line W—W' representing the front of such a wave and the line U the direction of travel thereof. It will be noted that the shot charges 1 are positioned so as to form two parallel, straight line arrays 2 and 3, each comprising five shot charges of the same size and equally spaced one from another. Although, for purposes of illustration, the arrays are shown as being composed of five shot points each, a greater or lesser number may be employed, provided, however, that each array includes at least two shot points and preferably at least three. In the case of the shot point arrangement shown in Figure 1 and formed, in accordance with this invention, in two parallel, straight line arrays for eliminating horizontally traveling waves within a selected frequency band and moving longitudinally along the arrays, the array lengths are unequal, but are adjusted by varying the spacing between the explosive charges so that each corresponds to an integral number of wave lengths of a wave having a frequency $f_0$ corresponding substantially to the mid-frequency of the band of waves to be eliminated from the combined output of the group. It is preferable in the interest of saving time and expense to have the length of one array 2 equal one wave length of the predetermined frequency; and the length of the other array 3 twice as great. The shot charges are connected preferably to a single detonating circuit whereby such charges may be detonated simultaneously. By arranging the shot charges as above described, horizontally traveling waves of a single predetermined frequency are cancelled or eliminated from the output of each of the arrays 2 and 3 individually. Moreover, by combining the two arrays horizontally traveling waves within a band of frequencies are cancelled to provide, upon reception and recordation of the energy reflected by subterranean formations and received by one or more seismometers at a reception point located approximately on the axis of the arrays, a record predominated by reflected waves.

Figure 4:
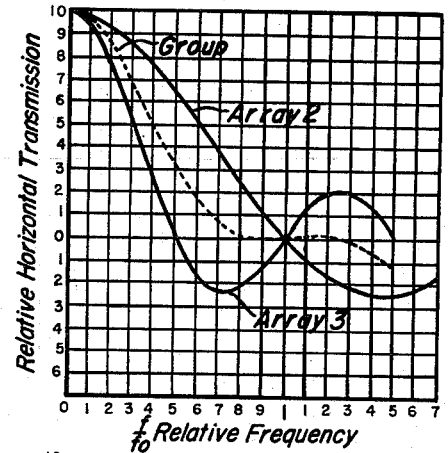
Figure 4 is a graph of a series of curves illustrating the relationship of the relative horizontal transmission of each of the arrays of the group of shots arranged as shown in Figure 1, and of the entire group, to the relative frequency of horizontally traveling waves.

Figure 4 is a series of curves illustrating the relationship of the relative horizontal transmission of each of the arrays of the group of shots arranged as shown in Figure 1, and of the entire group, to the relative frequency of horizontally traveling waves, the length of arrays 2 and 3 corresponding respectively to the wave length and twice the wave length of seismic waves of a given frequency $f_0$. The relative frequency is the ratio of the frequency of a particular horizontally traveling wave $f$ to the given frequency $f_0$. The relative horizontal transmission is the ratio of the actual transmission of the shot array or group, as the case may be, to the maximum possible transmission of the group which occurs in the vertical direction. It will be noted that the relative horizontal transmission of each of the arrays 2 and 3 is zero when the frequency $f$ of the horizontally traveling waves corresponds to the predetermined frequency $f_0$. It will be noted further that the relative horizontal transmission of the group is less than 5% of the maximum possible horizontal transmission for horizontally traveling waves within the frequency band 0.74 $f_0$ to 1.35 $f_0$.

By way of illustration, assuming that a conventionl seismometer and seismic amplifier are to be used for receiving and amplifying waves reflected off subsurface formations in accordance with the usual practice, which amplifier is responsive only to seismic energy within a frequency band of from 35 to 60 C. P. S., preferably one of the arrays, array 2, is adjusted to a length of 142.2 feet corresponding to the wave length of the mid-frequency of the amplifier band; and array 3 to a length of 284.4 feet. As above pointed out, the relative horizontal transmission of the shot group is less than 5% of the maximum possible response within the frequency band of 0.74 $f_0$ to 1.35 $f_0$, or in this illustration from 33 to 61 C. P. S. It is thus seen that a record trace may be obtained which is predominated by reflected waves.

Figure 2:
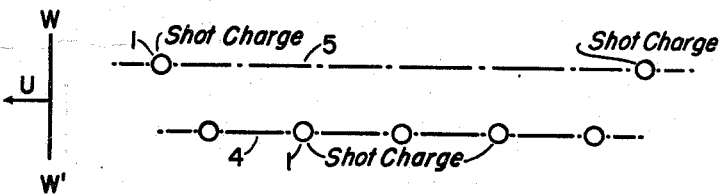
Figure 2 is a diagrammatic view showing a modification of the shooting arrangement of Figure 1 in which one of the arrays consists of only two shot points.
Figure 5:
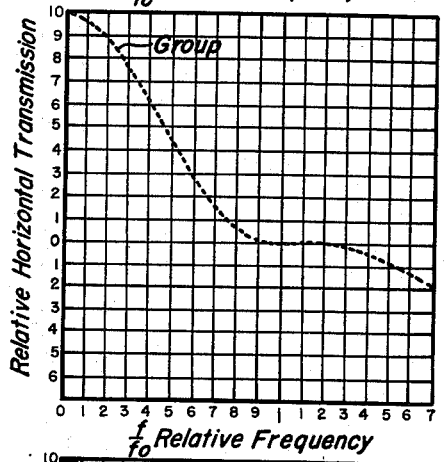
Figure 5 is a graph of a curve illustrating the relationship of the relative horizontal transmission of a group of shots arranged as shown in Figure 2 to the relative frequency of horizontally traveling waves.

Figure 2 shows a modified shot group comprising one array 4 composed of five shot points and another array 5 composed of two shot points, the length of array 5 being three times that of array 4. Because of the greater number of shot charges in array 4, the size of the charges in that array is made one-half that of the charges of array 5. It is preferable to adjust the size of the explosive charge in this manner so that greater cancellation in the output of the group is obtained than would have been obtained had the size of the explosive charges in array 4 not been decreased. The relationship of relative horizontal transmission of the group to relative frequency is shown in Figure 5. It will be noted that the relative horizontal transmission of the group for horizontally traveling waves moving longitudinally therealong is less than 5% of the maximum possible transmission within the frequency band 0.82 $f_0$ to 1.39 $f_0$.

Figure 3:
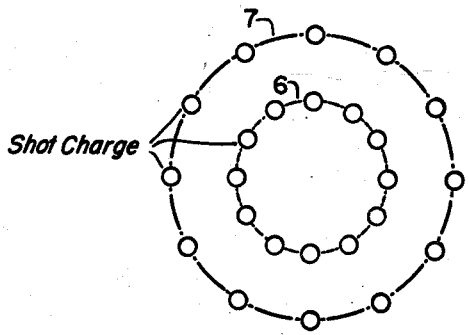
Figure 3 is a diagrammatic view showing an arrangement of shot points comprising two circular arrays whereby horizontally traveling waves within a predetermined frequency band moving in any direction from the shot points will be substantially eliminated from the seismic energy created by simultaneous detonation of the shot charges.

Referring now to Figure 3, in areas where it is desirable to eliminate all horizontally traveling waves regardless of the direction of travel thereof from the shot point, it is necessary to arrange the shot points of a group into two concentric circular arrays 6 and 7, each of the arrays including at least 6 shot points, and preferably 12, equally spaced one from another. The circular arrays 6 and 7 are of unequal lengths but of lengths such that the individual horizontal transmission of each array of horizontally traveling waves of a predetermined frequency is zero. The array lengths may be determined either experimentally or by simple mathematical calculations. Preferably one of the arrays, array 6, is so formed that its length, the circumference of the circle formed by the shot holes, is equal to $0.76\pi$ times the wave length of a given frequency $f_0$, preferably the mid-frequency of the frequency band within which it is desired to cancel the undesirable waves. The length of the other circular array 7 preferably is adjusted by varying the spacing between the shot holes to equal $1.75\pi$ times said wave length. All horizontally traveling waves having a frequency $f$ within said frequency band will be substantially cancelled or eliminated from the seismic energy generated upon simultaneous detonation of the shot charges.

Figure 6:
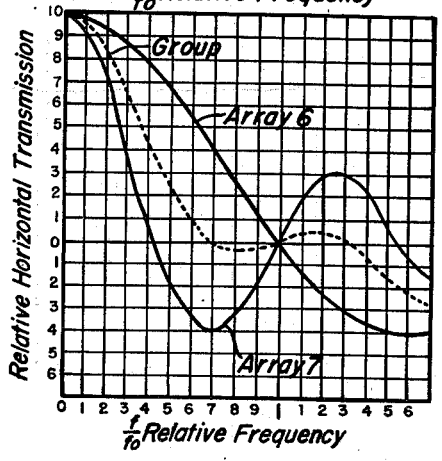
Figure 6 is a graph showing a series of curves illustrating the relationship of the relative horizontal transmission of each of the arrays of a group of shots arranged as shown in Figure 3, and also of the entire group, to the relative frequency of horizontally traveling waves.

Figure 6 is a series of curves illustrating the relationship of the relative horizontal transmission of each of the arrays of the group shown in Figure 3, and also of the entire group, to the relative frequency of horizontally traveling waves. It will be noted that the amount of horizontally traveling waves in the energy generated by detonation of the group of shot charges is less than 5% of the maximum possible horizontal transmission within the frequency band 0.65 $f_0$ to 1.38 $f_0$. It is readily seen that by making the cancellation frequency band of the shot group correspond to the band pass of the seismic amplifiers through proper adjustment of the lengths of arrays 6 and 7 there may be obtained a record trace from which horizontally traveling waves have been substantially completely eliminated.

The distance between the two parallel, straight line arrays of the groups shown in Figures 1 and 2 is not critical and may be varied from a few inches up to 30 feet or more, as desired. It is preferable, however, to space the arrays a distance of the order of 10 feet.

It is to be understood that the invention contemplates placing the explosive charges of a group within conventional shot holes, on the surface of the earth, or in the air.

While in the foregoing there has been shown and described the preferred embodiment of this invention, it is to be understood that minor changes in the details of construction, combination, and arrangement of parts may be resorted to without departing from the spirit and scope of the invention as claimed.

I claim:

1. A method for the investigation of earth substrata which comprises arranging a detector of seismic waves at a desired reception point in an area to be investigated, establishing a plurality of disturbance points spaced from the reception point and arranged to form parallel arrays lying in a substantially horizontal plane, each array consisting of a series of disturbance points equally spaced one from another, simultaneously creating a seismic disturbance at each of the disturbance points, and recording seismic waves received by the detector within a predetermined frequency band, the arrays being of unequal lengths but of lengths such that horizontally traveling waves of a frequency corresponding substantially to the mid-frequency of the predetermined frequency band are substantially eliminated from the combined seismic disturbance of each array.

2. A method for the investigation of earth substrata which comprises arranging a detector of seismic waves at a desired reception point in an area to be investigated, establishing a plurality of disturbance points spaced from the reception point and arranged to form two parallel arrays lying in a substantially horizontal plane, each array consisting of a series of disturbance points equally spaced one from another, simultaneously creating a seismic disturbance at each of the disturbance points, and recording seismic waves received by the detector within a predetermined frequency band, the arrays being of unequal lengths but of lengths such that horizontally traveling waves of a frequency corresponding substantially to the mid-frequency of the predetermined frequency band are substantially eliminated from the combined seismic disturbance of each array.

3. A method for the investigation of earth substrata which comprises arranging a detector of seismic waves at a desired reception point in an area to be investigated, establishing a plurality of disturbance points spaced from the reception point and arranged to form two circular concentric arrays, each array consisting of a series of disturbance points equally spaced one from another, simultaneously creating a seismic disturbance at each of the disturbance points, and recording seismic waves received by the detector within a predetermined frequency band, the arrays being of unequal lengths but of lengths such that horizontally traveling waves of a frequency corresponding substantially to the mid-frequency of the predetermined frequency band are substantially eliminated from the combined seismic disturbance of each array.

4. A method for the investigation of earth substrata which comprises arranging a detector of seismic waves at a desired reception point in an area to be investigated, establishing a plurality of disturbance points spaced from the reception point and arranged to form two circular concentric arrays, each array consisting of at least 8 disturbance points equally spaced one from another, simultaneously creating a seismic disturbance at each of the disturbance points, and recording seismic waves received by the detector within a predetermined frequency band, the arrays being of unequal lengths but of lengths such that horizontally traveling waves of a frequency corresponding substantially to the mid-frequency of the predetermined frequency band are substantially eliminated from the combined seismic disturbance of each array, and the shorter array being of a length equal to $0.76\pi$ times the wave length of said mid-frequency.

5. A method for the investigation of earth substrata which comprises arranging a detector of seismic waves at a desired reception point in an area to be investigated, establishing a plurality of disturbance points spaced from the reception point and arranged to form two circular concentric arrays, each array consisting of at least 8 disturbance points equally spaced one from another, simultaneously creating a seismic disturbance at each of the disturbance points, and recording seismic waves received by the detector within a predetermined frequency band, one array being of a length equal to $0.76\pi$ times the wave length of mid-frequency of the predetermined frequency band, and the other array being of a length equal to $1.75\pi$ times said wave length.

6. A method for the investigation of earth substrata which comprises arranging a detector of seismic waves at a desired reception point in an area to be investigated, establishing a plurality of disturbance points spaced from the reception point and arranged to form two parallel, straight line arrays lying in a substantially horizontal plane, each array consisting of a series of disturbance points equally spaced one from another, simultaneously creating a seismic disturbance at each of the disturbance points, and recording seismic waves received by the detector within a predetermined frequency band, the arrays being of unequal lengths but of lengths such that horizontally traveling waves of a frequency corresponding substantially to the mid-frequency of the predetermined frequency band are substantially eliminated from the combined seismic disturbance of each array.

JOHN P. WOODS.

References Cited in the file of this patent

UNITED STATES PATENTS

| Number | Name | Date |
|---|---|---|
| 1,827,371 | Rieber | Oct. 13, 1931 |
| 2,064,451 | Voorhees | Dec. 15, 1936 |
| 2,203,140 | Green | June 4, 1940 |
| 2,340,314 | Farnham | Feb. 1, 1944 |
| 2,545,380 | Poulter | Mar. 13, 1951 |

FOREIGN PATENTS

| Number | Country | Date |
|---|---|---|
| 701,747 | France | Mar. 21, 1931 |